US009753851B2

(12) United States Patent
Frazier et al.

(10) Patent No.: US 9,753,851 B2
(45) Date of Patent: Sep. 5, 2017

(54) MULTI-SECTION GARBAGE COLLECTION SYSTEM INCLUDING REAL-TIME GARBAGE COLLECTION SCHEDULING

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 14/972,604

(22) Filed: Dec. 17, 2015

(65) Prior Publication Data
US 2017/0177471 A1    Jun. 22, 2017

(51) Int. Cl.
G06F 12/12     (2016.01)
G06F 12/02     (2006.01)
G06F 9/48      (2006.01)

(52) U.S. Cl.
CPC ........ *G06F 12/0253* (2013.01); *G06F 9/4818* (2013.01); *G06F 2212/702* (2013.01)

(58) Field of Classification Search
None
See application file for complete search history.

(56) References Cited

U.S. PATENT DOCUMENTS

| 8,065,349 B2 | 11/2011 | Wright et al. |
| 8,205,203 B2 | 6/2012 | Auerbach et al. |
| 8,429,658 B2 | 4/2013 | Auerbach et al. |
| 2010/0100575 A1* | 4/2010 | Auerbach ............... G06F 9/526 708/100 |

OTHER PUBLICATIONS

Delozier, "Low Pause-Time Garbage Collection, Written Preliminary Exam II", The University of Pennsylvania, 2013, pp. 1-19.
Higuera-Toledano et al., "Parallel Real-Time Garbage Collection", Distributed Embedded Java Real Time Systems, Springer Science & Business Media, Chapter 4 (abstract only), Feb. 7, 2012, p. 79.

(Continued)

*Primary Examiner* — Duc Doan
(74) *Attorney, Agent, or Firm* — Cantor Colburn LLP; William A. Kinnaman, Jr.

(57) ABSTRACT

A computer system to schedule a garbage collection process within a computing environment comprises a memory unit and a hardware computer processor. The memory unit includes a load-monitored region configured to undergo a garbage collection process. The hardware computer processor is configured to perform operations comprising invoking a handler to obtain processing control in response to a request from an application to load a pointer that points to an object located within the load-monitored region, and determining by the handler a priority of the application, and performing a garbage selection process according to one mode among a plurality of different modes based on the priority.

20 Claims, 14 Drawing Sheets

(56) References Cited

OTHER PUBLICATIONS

Pizlo et al., "Hierarchical Real-time Garbage Collection", Proceedings of the 2007 ACM SIGPLAN/SIGBED Conference on Languages, compilers, and tools for embedded systems, vol. 42, Issue 7, Jul. 2007, pp. 123-133.
Frazier et al., "Multi-Section Garbage Collection System Including Multi-Use Source Register", U.S. Appl. No. 14/974,008, filed Dec. 18, 2015.
Frazier et al., "Multi-Section Garbage Collection System Including Shared Performance Monitor Register", U.S. Appl. No. 14/972,345, filed Dec. 17, 2015.
List of IBM Patents or Patent Applications Treated as Related; (Appendix P), Filed Feb. 24, 2016; 2 pages.

* cited by examiner

MULTI-SECTION GARBAGE COLLECTION SYSTEM INCLUDING REAL-TIME GARBAGE COLLECTION SCHEDULING

BACKGROUND

Various non-limiting embodiments described herein relate generally to computer memory management, and more specifically, to a multi-section garbage collection system.

Garbage collection is an automatic memory management process that identifies objects in memory that are no longer being referenced and frees those objects. As memory objects of varying sizes are allocated and later freed, the memory in which they are stored becomes increasingly fragmented. Eventually, very few large free areas of memory exist, and it becomes difficult to store additional objects without increasing the memory size. When this occurs, a process within garbage collection, referred to as compaction, is employed in order to consolidate the allocated objects into one large area, leaving another large area of free space available for new objects. During consolidation, the memory objects that are still being referenced are moved from one area of memory to another area of memory.

Conventionally, when garbage collection is performed on an object storage area, applications using the object storage area are required to pause or halt execution. One reason for this is to determine whether the pointers to the objects used by the applications to access the objects are still valid, since the objects may have moved. These pauses, occasionally several seconds long, prevent the applications from being used for time-sensitive tasks, such as transaction processing, real-time games, or mechanical control. Thus, a need exists for an optimized garbage collection process.

SUMMARY

According to a non-limiting embodiment, a computer system to schedule a garbage collection process within a computing environment comprises a memory unit and a hardware computer processor. The memory unit includes a load-monitored region configured to undergo a garbage collection process. The hardware computer processor is configured to perform operations comprising invoking a handler to obtain processing control in response to a request from an application to load a pointer that points to an object located within the load-monitored region, and determining by the handler a priority of the application, and performing a garbage selection process according to one mode among a plurality of different modes based on the priority.

According to another non-limiting embodiment, a method of performing real-time garbage collection scheduling to manage a memory unit comprises designating in the memory unit a load-monitored region configured to undergo a garbage collection process. The method further comprises invoking a handler to obtain processing control in response to a request from an application to load a pointer that points to an object located within the load-monitored region, and determining by the handler a priority of the application. The method further comprises performing a garbage selection process according to one mode among a plurality of different modes based on the priority.

According to still another non-limiting embodiment, a computer program product of performing real-time garbage collection scheduling to manage a memory unit. The computer program product comprises a computer readable storage medium having program instructions embodied therewith. The program instructions are executable by an electronic computer processor to perform operations including designating in the memory unit a load-monitored region configured to undergo a garbage collection process. The method further comprises invoking a handler to obtain processing control in response to a request from an application to load a pointer that points to an object located within the load-monitored region, and determining by the handler a priority of the application. The method further comprises performing a garbage selection process according to one mode among a plurality of different modes based on the priority.

Additional features are realized through the techniques of the present invention. Other embodiments are described in detail herein and are considered a part of the claimed invention. For a better understanding of the invention with the features, refer to the description and to the drawings.

DETAILED DESCRIPTION

Figure 1:
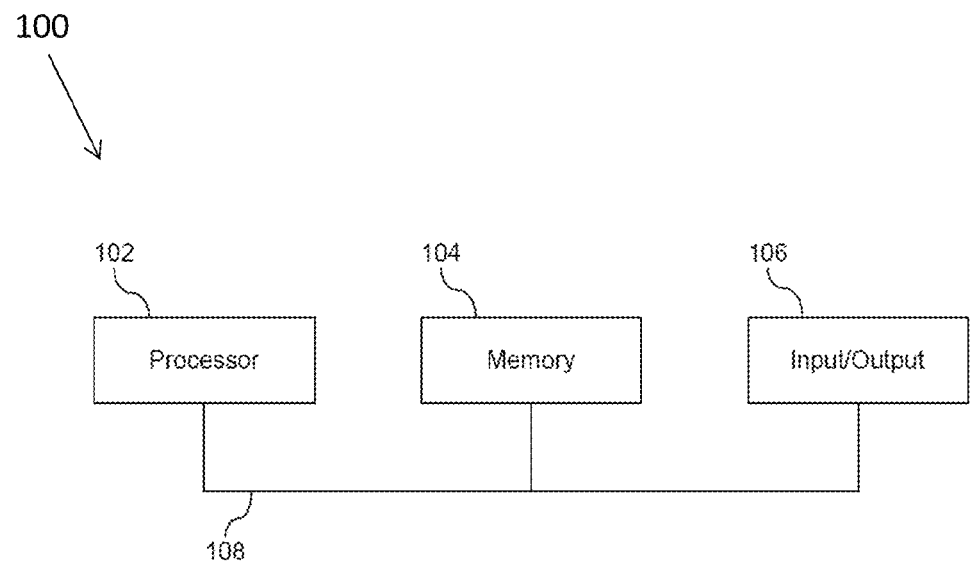
FIG. 1 depicts a block diagram illustrating a computing environment to incorporate and use one or more aspects.

In accordance with one or more aspects, a capability is provided for an optimized garbage collection process that advantageously improves application performance, improves performance of the processor executing the application, and/or improves performance of the computing environment in which the processor executes.

The optimized garbage collection process allows applications (also referred to as programs) that are accessing objects in an area of memory not undergoing garbage collection to continue processing during garbage collection without interruption, allows applications accessing objects in an area of memory being garbage collected to continue processing after a very short unnoticeable delay, and further improves the handling of the object pointers (also referred to as pointers). In one embodiment, an instruction, referred to as a load monitored doubleword indexed (ldmx) instruction, is provided and used whenever an application accesses a pointer to an object in memory. When such an instruction accesses a pointer that indicates an object that lies within a given address range, the processor causes an asynchronous branch (referred to as an Event-Based Branch (EBB)) to a pointer update handler (also referred to as a garbage collection handler, an EBB handler, or handler). This enables the pointer update handler to update the pointer (e.g., the address of the object) if the object pointed to has been moved during an ongoing garbage collection process or is moved by the handler. In order to update the pointer, the handler needs to know its address. In one embodiment of the instruction, the address of the pointer is calculated internally by the hardware during execution of the ldmx instruction, and is not available to the pointer update handler. Thus, in order to determine the address of the pointer, the pointer update handler examines the ldmx instruction to determine the source registers, reads the source registers, and calculates the address of the pointer based on contents of the source registers.

In addition, at least one embodiment provides a feature where the hardware (e.g., the handler) which invokes the garbage collection EBB determines the amount of garbage collection work to perform based on the fairness and urgency of the running application, or importance of the current task. Various criteria may be considered when determining the fairness, urgency or importance including, but not limited to, program priority, a pre-allocated time per EBB assigned to the application, the current number of work credits assigned to the application, i.e., where work credits are earned by doing garbage collection work when not engaged in critical tasks, latency requirements of the application (e.g., low latencies for high-speed trading), and the amount of remaining unused object space. Thus, the amount of garbage collection work can be dynamically reduced when the handler determines that the current task or running application is assigned a high-priority, for example, and vice-versa. Upon invoking the garbage collection EBB, various operations may be performed to determine the amount garbage collection work done including, but not limited to, performing a fixed GC work or moving a fixed number of objects, setting the amount of garbage collection work performed to be proportional to a priority of the current application or task, determining an amount of bounded time spent on performing garbage collection work, and using a credit-based scheme to determine the amount work to perform. When a credit-based scheme is performed, the garbage collection work may be performed on-demand as objects are accessed. This results in a fair execution of the garbage collection EBB since the amount of garbage collection work is based on the rate of object usage.

With reference now to FIG. 1, a block diagram (100) is provided illustrating a computing environment to incorporate and use one or more aspects. The computing environment includes a processor (102) (e.g., a central processing unit), memory 104 (e.g., main memory), and one or more input/output (I/O) devices and/or interfaces (106) coupled to one another via, for example, one or more buses (108) and/or other connections.

The processor (102) is based on the Power Instruction Set Architecture (ISA) offered by International Business Machines Corporation. In at least one embodiment, the Power ISA is described in "Power ISA™ Version 2.07B," International Business Machines Corporation, Apr. 9, 2015, which is hereby incorporated herein by reference in its entirety. POWER ISA® is a registered trademark of International Business Machines Corporation, Armonk, N.Y., USA. Other names used herein may be registered trademarks, trademarks, or product names of International Business Machines Corporation or other companies.

In another example, processor (102) is based on the z/Architecture offered by International Business Machines Corporation, and is part of a server, such as the System z server, which implements the z/Architecture and is also offered by International Business Machines Corporation. At least one embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor (102) is based on an Intel architecture offered by Intel Corporation. Intel® is a registered trademark of Intel Corporation, Santa Clara, Calif. Yet further, processor (102) may be based on other architectures. The architectures mentioned herein are merely provided as examples.

Figure 2:
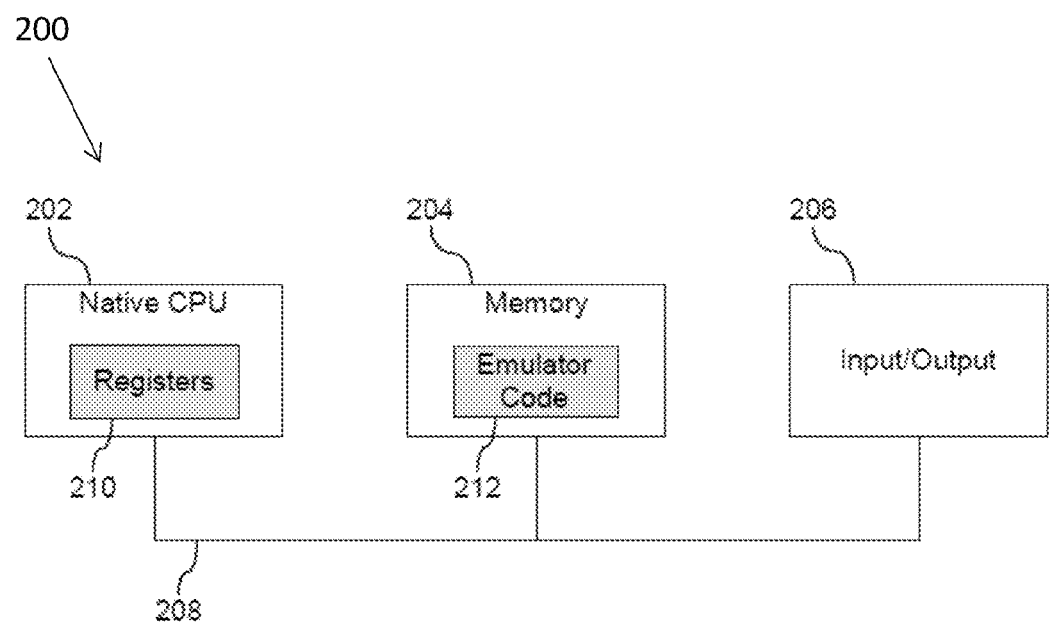
FIG. 2 depicts a block diagram illustrating a computing environment to incorporate and use one or more aspects.

Another non-limiting embodiment of a computing environment to incorporate and use one or more features is described with reference to FIG. 2. In this example, a computing environment (200) includes, for instance, a native central processing unit (202), memory (204), and one or more input/output devices and/or interfaces (206) coupled to one another via, for example, one or more buses (208) and/or other connections. As examples, computing environment (200) may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit (202) includes one or more native registers (210), such as one or more general purpose registers and/or one or more special purpose registers used during processing within the environment. These registers include information that represents the state of the environment at any particular point in time.

Moreover, native central processing unit (202) executes instructions and code that are stored in memory (204). In one particular example, the central processing unit executes emulator code (212) stored in memory (204). This code enables the processing environment configured in one architecture to emulate another architecture. For instance, emulator code (212) allows machines based on architectures other than the Power ISA, such as zSeries servers, pSeries servers, HP Superdome servers or others, to emulate the Power ISA and to execute software and instructions developed based on the Power ISA. In a further example, emulator code (212) allows machines based on architectures other than the z/Architecture, such as PowerPC processors, p Series servers, HP Superdome servers or others, to emulate the z/Architecture and to execute software and instructions developed based on the z/Architecture. Other architectures may also be emulated.

Figure 3:
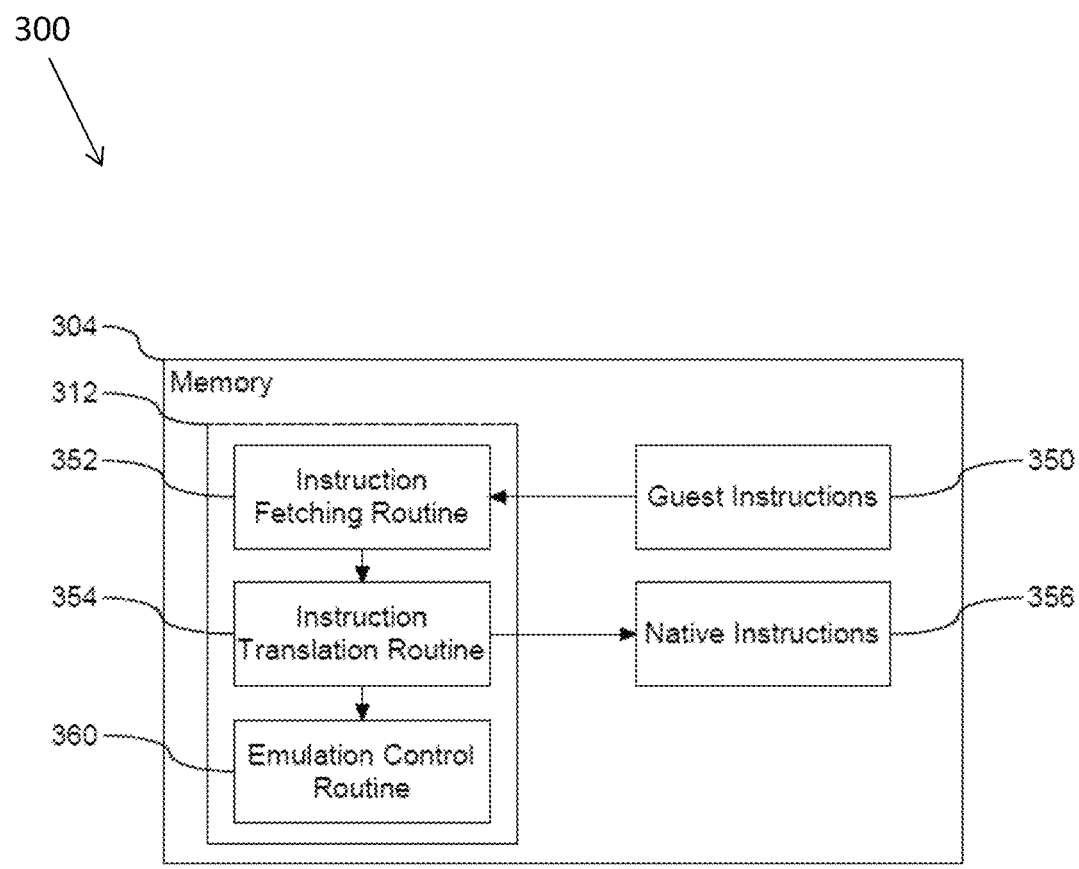
FIG. 3 depicts a block diagram illustrating further details with respect to the memory of FIG. 2.

Further details relating to emulator code (212) are described with reference to FIG. 3. As shown, FIG. 3 is a block diagram (300) of a computing environment. Guest instructions (350) stored in memory (304) comprise software instructions (e.g., correlating to machine instructions) that were developed to be executed in an architecture other than that of a native CPU. For example, guest instructions (350) may have been designed to execute on a PowerPC processor or a z/Architecture processor, such as processor (102) of FIG. 1, but instead, are being emulated on a native CPU, such as native CPU (202). The native CPU may be, for example, an Intel Itanium II processor. In one example, emulator code (312) includes an instruction fetching routine (352) to obtain one or more guest instructions (350) from memory (304), and to optionally provide local buffering for the instructions obtained. It also includes an instruction translation routine (354) to determine the type of guest instruction that has been obtained and to translate the guest instruction into one or more corresponding native instructions (356). This translation includes, for instance, identifying the function to be performed by the guest instruction and choosing the native instruction(s) to perform that function.

Further, emulator code (312) includes an emulation control routine (360) to cause the native instructions to be executed. Emulation control routine (360) may cause a native CPU to execute a routine of native instructions that emulate one or more previously obtained guest instructions and, at the conclusion of such execution, return control to the instruction fetch routine to emulate the obtaining of the next guest instruction or a group of guest instructions.

Execution of the native instructions (356) may include loading data into a register from memory (304); storing data back to memory from a register; or performing some type of arithmetic or logic operation, as determined by the translation routine.

Each routine is, for instance, implemented in software, which is stored in memory and executed by a native central processing unit. In other examples, one or more of the routines or operations are implemented in firmware, hardware, software or some combination thereof. The registers of the emulated processor may be emulated using registers of the native CPU or by using locations in memory (304). The guest instructions (350), the native instructions (356), and the emulator code (312) may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. The firmware may include, for example, proprietary code that is typically delivered as microcode that includes trusted software or microcode specific to the underlying hardware and controls operating system access to the system hardware.

In one example, a guest instruction (350) that is obtained, translated and executed is an instruction described herein. The instruction, which is of one architecture (e.g., the Power ISA or z/Architecture) is fetched from memory, translated and represented as a sequence of native instructions (356) of another architecture (e.g., the z/Architecture, Power ISA, Intel architecture, etc.). These native instructions are then executed.

In existing art, load doubleword indexed (ldx) instructions are not used to load object pointers, sometimes also referred to as "pointers". Instead, a load doubleword monitored indexed instruction (ldmx) is implemented. That is, whenever object pointers are to be loaded, the ldmx instruction is used, but in all other cases when loading doublewords, the traditional ldx instruction may be used. The load doubleword monitored indexed (ldmx) instruction has the same format as the load doubleword indexed (ldx) instruction, except the opcode is different as explained below.

Figure 4A:
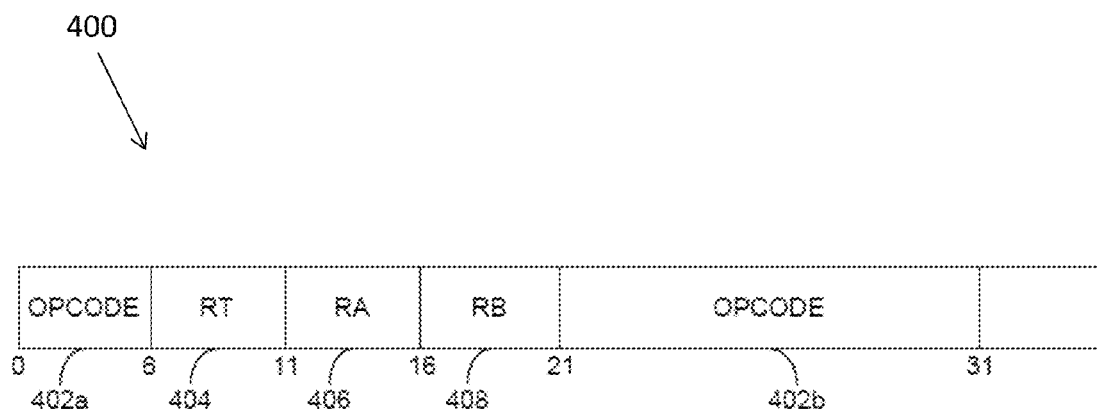
FIG. 4A depicts an illustrative example of a load monitored doubleword indexed instruction.

An example of a load doubleword monitored indexed instruction is described with reference to FIG. 4A. The load doubleword monitored indexed (ldmx) instruction (400) includes operation code (opcode) fields (402a) (e.g., bits 0-5), (402b) (e.g., bits 21-30) indicating a load pointer operation; a result field (RT) (404) (e.g., bits 6-10) used to indicate a register to store a result of the load operation (i.e. the pointer); a register field (RA) (406) (e.g., bits 11-15) used to specify a register to be used by the load operation; and a second register (RB) (408) (e.g., bits 16-20) used to specify a second register to be used by the load operation. In at least one embodiment, bit 31 is reserved and may not used by the instruction.

In operation of the ldmx instruction, a check is made as to whether the data to be loaded (e.g., the object pointer) points to an object located in a selected portion of memory, referred to herein as a load monitored region. If the data to be loaded does not point to an object located in the selected portion of memory, then a conventional load is performed. For instance, in one example, the load is performed as if a load doubleword indexed instruction (e.g., in the Power ISA) is being executed.

One example of pseudo-code for the ldmx instruction is as follows:
If RA=0, then b←0
else, b←(RA)
EA←b+(RB)
loaded_ea←MEM(EA, 8)
if, (loaded_ea is in enabled section of load-monitored region) & (BESCR$_{GE}$ LME=0b11)
initiate garbage collection EBB
Else
   RT←loaded_ea, In the above pseudo-code, "loaded_ea" is the object pointer; "EA" is an address of the object pointer; "BESCR" refers to branch event status-control register; "GE" refers to general enable; and "LME" refers to load monitored enabled. As shown in the pseudo-code, the effective address (EA) of the pointer to be loaded is the sum (RA|0)+(RB). If the pointer to be loaded points to an enabled section of the load monitored region and EBBs are enabled in the BESCR fields GE and LME, then a lightweight interrupt, referred to as an "Event-Based Branch (EBB), occurs; otherwise, otherwise, the pointer is loaded into the destination register, RT. It should be noted that lightweight interrupts such as EBBs transfer control directly to an application-level EBB handler, thereby eliminating the involvement of the operating system as occurs in "normal" interrupts. This advantageously eliminates a significant amount of overhead necessary whenever control is transferred to an operating system. Although, in the examples herein, the instruction format is for the Power ISA, similar formats may be used for other architectures.

Alternatively, the load doubleword monitored (ldm) instruction may be used instead of ldmx. The ldm instruction behaves like ldmx except that the EA accessed would be calculated like a load doubleword (ld) instruction using RA and DS fields instead of operands RA and RB as with ldx.

An example of a load doubleword monitored instruction is described with reference to FIG. 4B. The load doubleword monitored (ldm) instruction (420) includes operation code (opcode) fields (422) indicating a load pointer operation; a result field (RT) (424) used to indicate a register to store a result of the load operation (i.e. the pointer); a register field (RA) (426) used to specify a register to be used by the load operation; and an offset field (DS) used to specify a variable to be used by the load operation.

One example of pseudo-code for the ldm instruction is as follows:
If RA=0, then b←0
Else, b←(RA)
EA←b+EXTS(DS∥0b00)
loaded_ea←MEM(EA, 8)
if, (loaded_ea is in enabled section of load-monitored region) & (BESCR$_{GE}$ LME=0b11)
initiate garbage collection EBB,
Else, RT←loaded_ea As shown in the pseudo-code, the effective address (EA) of the pointer to be loaded is the sum (RA|0)+EXTS (DS∥0b00). Other than calculating the EA as above, the operation of the ldm instruction is identical to the operation of the ldmx instruction described earlier. Although, in the examples herein, the instruction format is for the Power ISA, similar formats may be used for other architectures.

Figure 5:
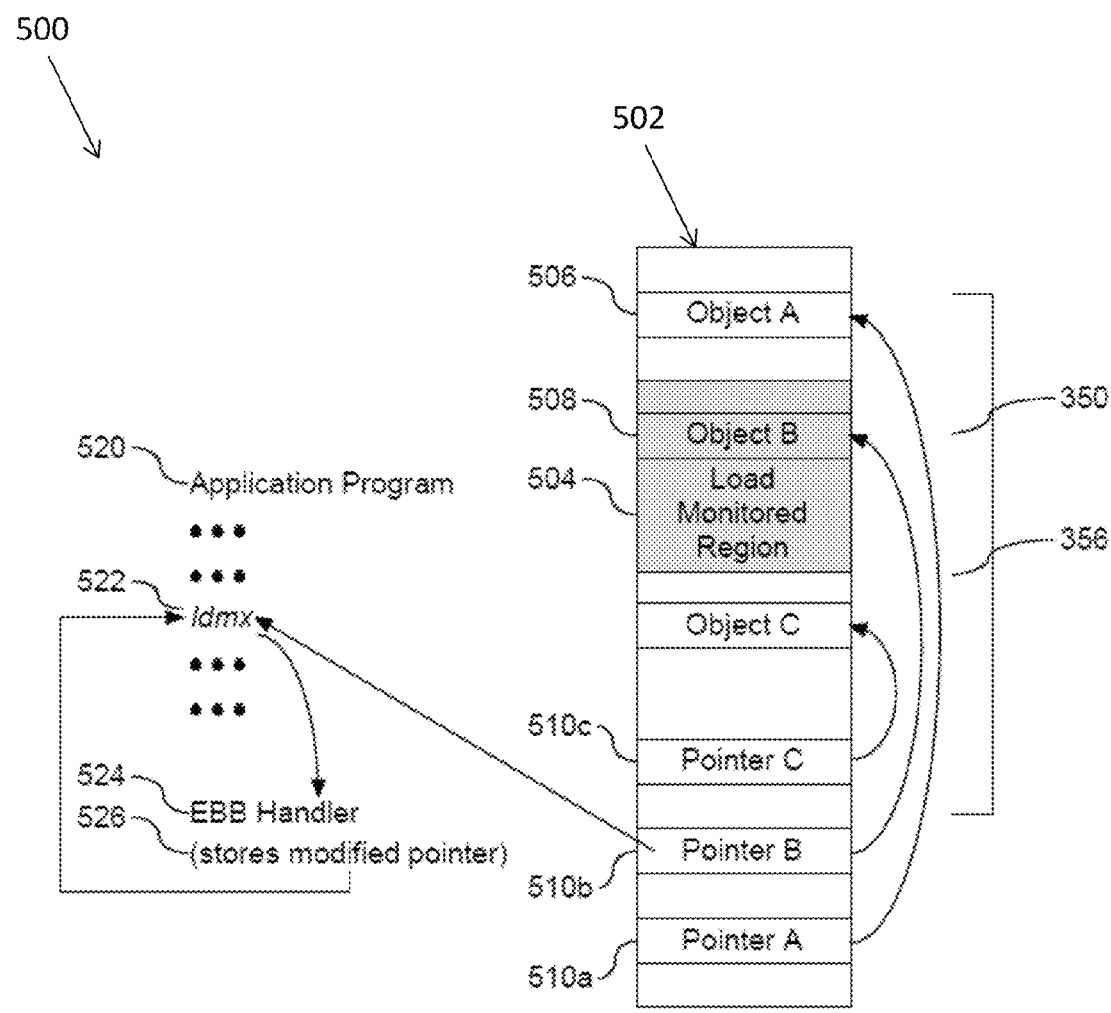
FIG. 5 depicts a block diagram illustrating detail of memory for which garbage collection is to be performed.

As explained previously, the selected portion of memory undergoing garbage collection (e.g., a memory block of user address space) is referred to herein as the load monitored region. Referring to FIG. 5, a block diagram (500) is shown illustrating memory, and specifically regions within the memory. As shown, memory (502) includes a load monitored region (504), as well as a plurality of objects, including ObjectA (506) and ObjectB (508). As shown, ObjectB (508) is in the shaded load monitored region (504), meaning that the object is in a portion of memory in which garbage collection is being performed. Therefore, the current pointer may need to be updated, if the object to which the pointer points has been moved due to, for instance, the garbage collection process.

Further, as used herein, an object area includes the load monitored region and the area of memory including objects that are not undergoing garbage collection. Additionally, the memory (502) may include a plurality of pointers shown as pointerA (510a), pointerB (510b), and pointerC (510c).

In this figure, it is further shown that an application program (520) executes an ldmx instruction (522), which attempts to load pointerB (510b). PointerB (510b) points to ObjectB (508) in the load monitored region, and thus, an EBB is performed giving control to the EBB handler (524) (also known as the update pointer handler, or handler). The handler (524) calculates a pointer address for PointerB (510b), i.e., the address at which PointerB (510b) is located, by reading the image of the load monitored instruction to determine the source registers, reading the source registers, and calculating the pointer address using data read from the source registers. The handler (524) then reads the pointer using a "normal" load instruction, modifies the pointer, if necessary, and if modified stores the pointer in the location from which it was obtained (526). Processing then returns to the application at the ldmx instruction, which is re-executed. Details of the pointer address calculation are shown in the pseudo code described above.

Alternatively, the handler may modify the pointer, and store the modified pointer in the target register of the instruction. Processing would then continue at the instruction after the ldmx instruction. This would have the effect of emulating the load of the pointer without the need to re-execute the ldmx instruction. In one or more aspects, the application is unaware of the EBB processing, and simply receives the pointer, as if the EBB never occurred.

Figure 6:
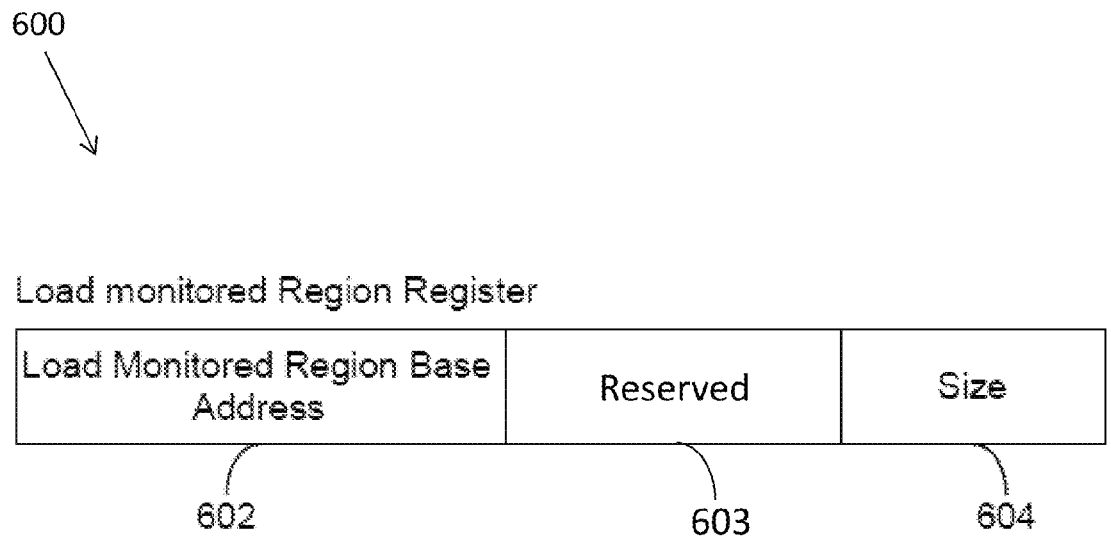
FIG. 6 depicts an illustrative example of a load monitored region register.

As indicated above, lightweight interrupt processing is performed when the data to be loaded (e.g., the object pointer) points to an object that is in the load monitored region of memory. The load monitored region may be identified in alternative ways. For instance, in one implementation, its size and base address are stored in a register, such as depicted in FIG. 6. As shown, a load monitored region register (LMRR) (600) includes, for instance, a base address field (602) including a load monitored region base address, a reserved field (603) that is not used here but is reserved for use in future enhancements, and a size field (604) indicating a size of the region. The size field (604) ranges, for example, from bits 60 to 63.

In one example, the load monitored region base address includes the high-order bits of the load monitored region. It may be assumed that the load monitored region is aligned on a granularity of its size. The size field is encoded such that each value corresponds to a specified size. For example, if 16 possible sizes are needed, the size field has 4 bits. Typical sizes are in the order of 10's of MBs (megabytes) to over a GB (gigabyte). The number of bits in the load monitored region base address field can be derived from the minimum size supported.

For example, if the minimum size supported is 16 MB, then the load monitored region base address field is 40 bits, which is sufficient to identify any 16 MB memory region aligned on a 16 MB address boundary. When the size field indicates smaller sizes, then more bits are required to specify the base address.

In other examples, the size and base address may be specified in a memory location, or as part of another register used for another purpose, etc. Additionally, other formats may be used to specify the address range of the load monitored region.

The load monitored region may be subdivided into segments of equal size, where each segment is 1/Nth of the total load monitored region size. A Load Monitored Segment Enable Register (LMSER) may also be provided where each bit corresponds to a segment. For example, a 64-bit register could be used to subdivide a load monitored region into 64 segments, where each segment is 1/64th of the total load monitored region.

The LMRR 600 may indicate a base address and size of a garbage collection (GC) region. The regions include a single block of storage aligned on a multiple of its size. For example, region sizes may increase in size by a factor of 2, e.g., 32 MB, 64 MB, 128 MB, 256 MB, 512 MB, 1 GB, 2 GB, 4 GB, 8 GB, 16 GB, 32 GB, 64 GB, 128 GB, 256 GB, 512 GB, 1 TB, etc. The base address field (602) ranges from bit 0 to bit 38, for example, where bit 0 is the most-significant bit. Accordingly, the execution of the ldmx instruction assumes that all regions are aligned on multiples of their size. In an example including a region size of 1 TB, the ldmx instruction uses bits 0 to 23 in identifying the load monitored region, while ignoring bits 24 to 38 of the base address field. In another non-limiting embodiment including a region size of 32 MB, the ldmx instruction uses every bit of the base address field, i.e., bits 0 to 38, in identifying the load monitored region.

Figure 7:
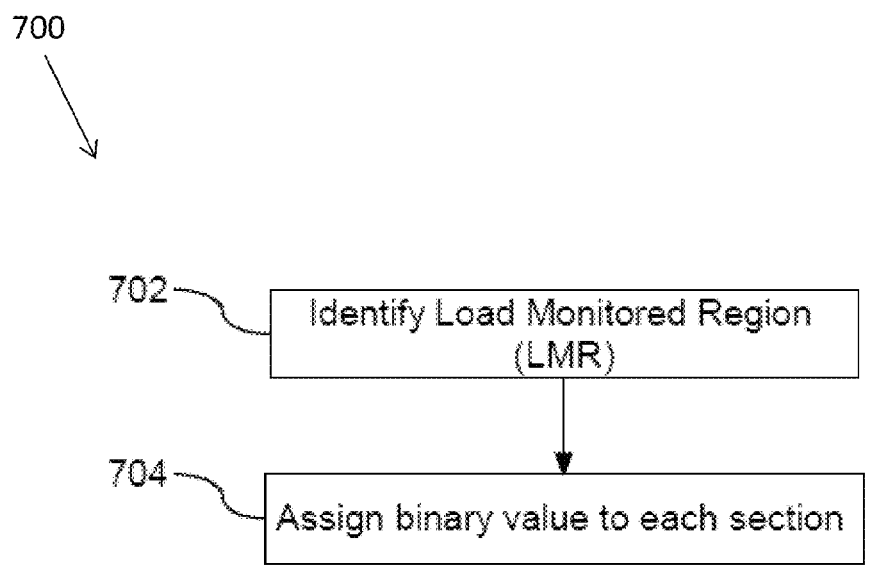
FIG. 7 depicts a flowchart illustrating a process for configuring the LMRR and LMSER.

Now with reference to FIG. 7, a flowchart (700) is provided illustrating an example as to how the LMRR and LMSER are configured. First, the load monitored region (LMR) is specified in the LMRR (702). Details of such specification have been described above, with reference to FIG. 6. Then a binary value is assigned to each section in the LMSER (704), where a first binary value corresponds to an enabled section (i.e., a section of the load monitored region that is identified for garbage collection), and a second binary value corresponds to a disabled section (i.e., a section that is not subject to garbage collection).

Figure 8A:
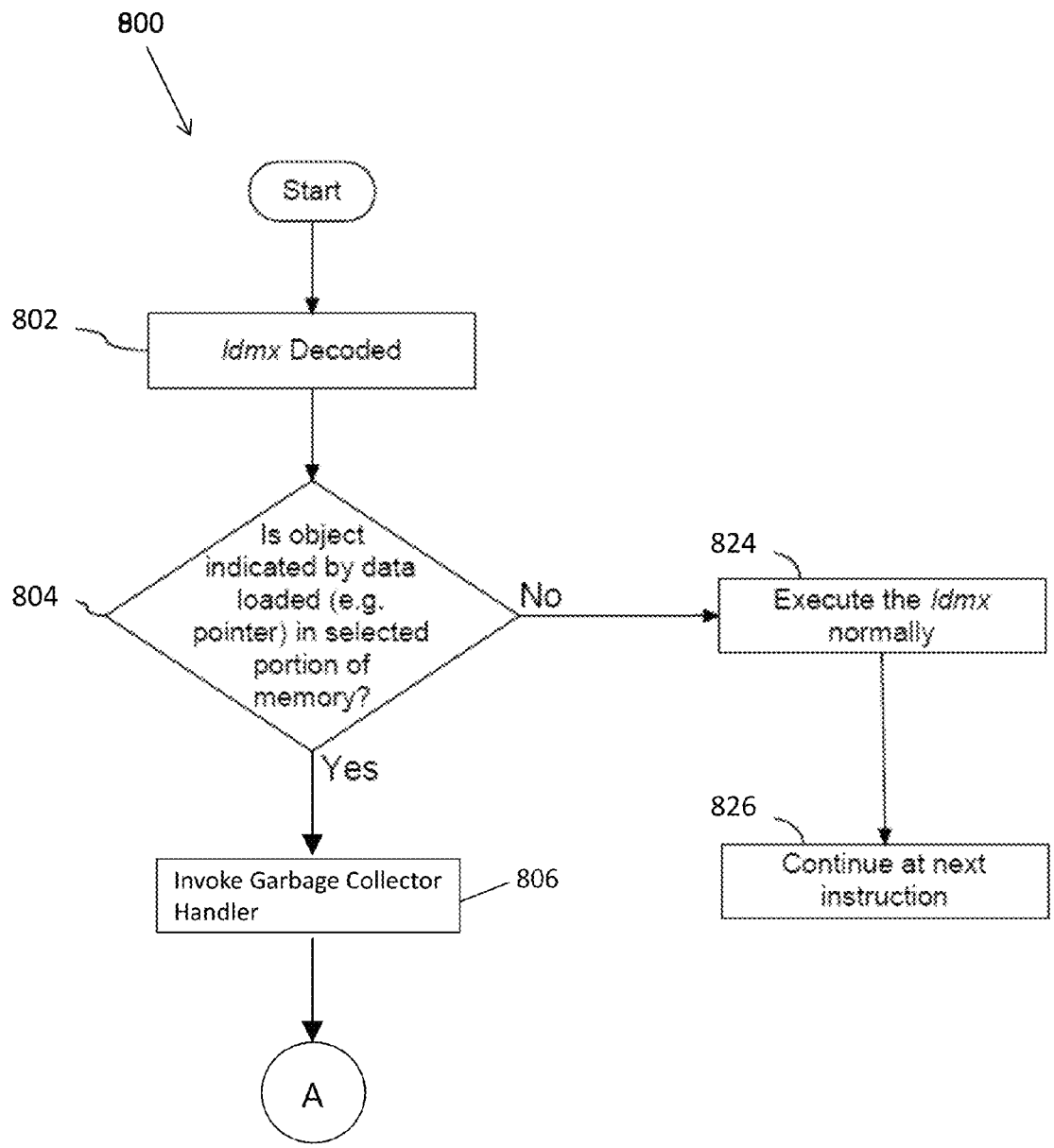
FIGS. 8A-8B depict an illustrative example of logic to perform garbage collection using the load monitored doubleword indexed instruction.

Referring now to FIG. 8A, a flowchart (800) illustrates an example of logic associated with executing the ldmx instruction. The hardware of a processor executes an application that issues the ldmx instruction, and the processor hardware decodes the ldmx instruction (802). During execution of the instruction, the processor hardware determines the memory location addressed by the instruction, and compares the data at that address (i.e., the pointer) read with the load monitored region register (or other register or memory location) that specifies the selected portion of memory undergoing the garbage collection (804). If the pointer that was read points to a location within the load monitored region, then the hardware causes a lightweight interrupt (e.g., an Event Based Branch that does not involve the supervisor) that diverts execution to the garbage collection handler at operation 806.

Figure 4B:
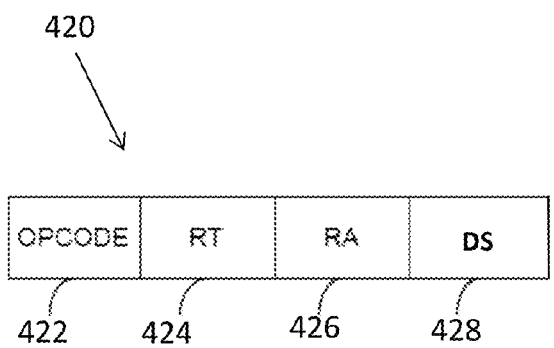
FIG. 4B depicts an illustrative example of load doubleword monitored instruction.

Turning to operation 808 (see FIG. 8B), the garbage collector EBB reads the instruction image, and at operation 810 the garbage collector EBB handler reads the ldm instruction image to determine the source register (see FIG. 4B, element 426) and the offset value DS (see FIG. 4B, element 428.) At operation 812, the garbage collector handler calculates the pointer EA from source register RA contents and offset field DS, and based on the calculations determines the pointer address at operation 814.

Figure 8B:
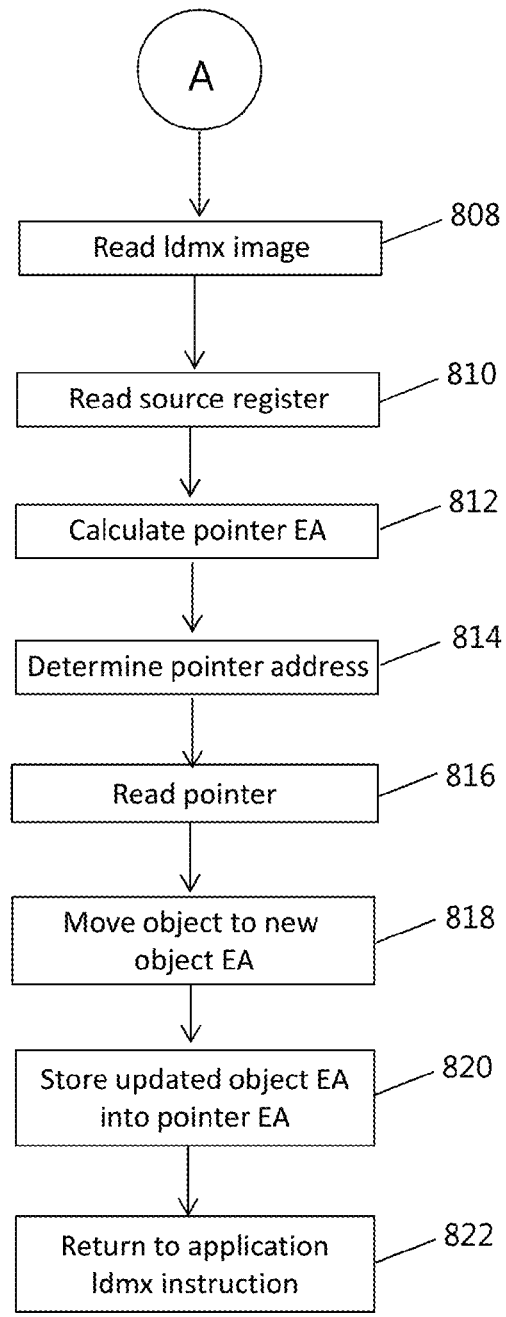

Still referring to FIG. 8B, at operation 816 the garbage collection handler reads the pointer from the address that was determined as explained above (e.g., operation 814). At operation 818, the garbage collection handler moves the object to a location outside of the load monitored region, and updates the pointer to point to the object. At operation 820, the EA is loaded with the updated pointer, and the garbage collection handler returns control to the application at the ldmx instruction at operation 822. When the application re-executes the ldmx instruction, since the pointer now points outside the load monitored region as explained above, the ldmx loads the pointer without interruption.

Returning to operation (804), if the pointer that was read does not point to a location within the load monitored region, then the processor hardware does not cause the Event Based Branch, but instead executes the ldmx instruction without causing the EBB at operation (824). For instance, the ldmx instruction is processed as if the load doubleword indexed instruction was executed, as described above. In particular, in one example, the pointer is read from the location identified by the instruction and it is stored in the target register. Thereafter, processing continues to the next instruction at operation (826).

As described herein, garbage collection is optimized by allowing applications to continue processing (without being paused due to garbage collection) when those applications are not accessing objects in an area of memory undergoing garbage collection. Further, garbage collection is optimized by allowing applications accessing objects in an area of memory undergoing garbage collection to immediately resume processing after a very brief delay during the time the lightweight interrupt handler processes the pointer. This is enabled by determining during the load of the pointer that the object is in the selected portion of memory undergoing garbage collection, and based thereon, causing an EBB to occur such that the handler may take immediate action and quickly return control to the application.

Additionally, one or more aspects of the ldmax instruction may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region. Subsequently, when a pointer is read that points to a restricted area, an EBB occurs.

Figure 9:
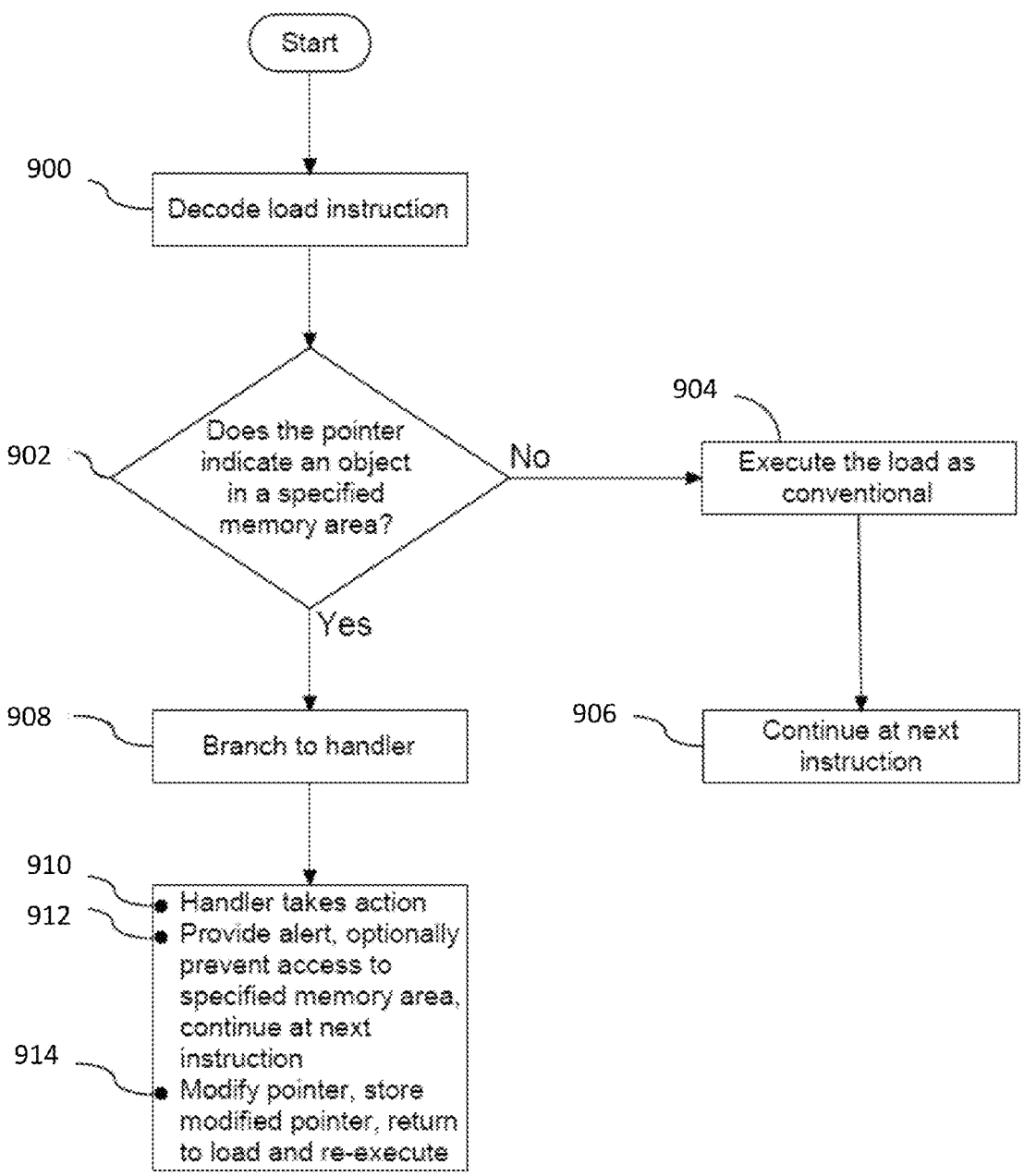
FIG. 9 is a flow diagram illustrating a non-limiting embodiment of logic to take action by a handler based on a condition.

For example, a handler may take action based on a specific condition as described with reference to FIG. 9. In one example, a load instruction is decoded, (900). The load instruction may be one of various load instructions, including the ldm or ldmx instruction, as examples. The load instruction is decoded and based on the decoding, the object pointer is determined. A determination is made as to whether the object pointer indicates an object in a specified memory area, (902). This memory area is, for instance, a specified storage address range that is to be restricted for one reason or the other. If the pointer does not indicate an object in the specified memory area, then the ldmx (or other instruction) is executed as conventional, (904). Processing then continues at the next instruction, (906).

However, returning to (902), if the pointer does indicate an object in a specified memory area, then control is obtained by a handler, (908). For instance, the processor hardware performs an interrupt (e.g., a lightweight interrupt that does not involve the operating system) to the handler (e.g., an application-level handler). The handler may then take one or more actions, (910). For example, the handler may provide an alert, optionally prevent access to the specified memory area, and then continue processing at the next instruction, (912). As a further example, the handler may obtain the pointer address (e.g., calculates it from the instruction), read the pointer, modify the pointer, store the modified pointer back in the location from which it was read, and return control to the instruction and re-executes the instruction, such that the specified memory area is not accessed, (914). Other possibilities also exist.

Various conventional schemes have been developed in an attempt to minimize the performance impact of garbage collection. Some of these schemes include, for example, breaking up the garbage collection work into small increments so that garbage collection work can be time sliced with application work ("incremental" collectors), and enabling multiple threads to perform garbage collection in parallel so that the impact on each application is minimized. Schemes have also been developed that attempt to fairly apportion garbage collection work among the applications that use the heap. Some schemes involve a concept of "taxation," in which each application is levied a "tax," or an amount of garbage collection it must perform, based on its usage rate of the objects in the heap. Such taxation and other fairness schemes add a significant amount of complexity and overhead to the garbage collection process.

Also, all of the above schemes rely on periodic interruptions that require all applications to be simultaneously paused during the times when objects are in the process of being moved (i.e. during the "compaction phase"). These periodic pauses (sometimes referred to as "stop the world" pauses), are time consuming, and they impact both latency and throughput of all applications. Also, since periodic pauses occur without regard to the rate at which the thread is using the heap, the performance of threads that seldom use the heap are unfairly impacted.

According to at least one non-limiting embodiment of the invention, however, a garbage collection scheduling scheme is provided which does not require all applications to simultaneously pause during the compaction phase, and which also fairly allocates garbage collection work among the applications. In at least one embodiment, garbage collection work is allocated according to application priority, where high-priority applications are required to perform less garbage collection work than low-priority applications. In other embodiments, a very simple taxation scheme is employed that enables high priority applications to avoid all garbage collection work, and that fairly allocates garbage collection work among lower-priority applications according to their usage rate of the heap.

Figure 10:
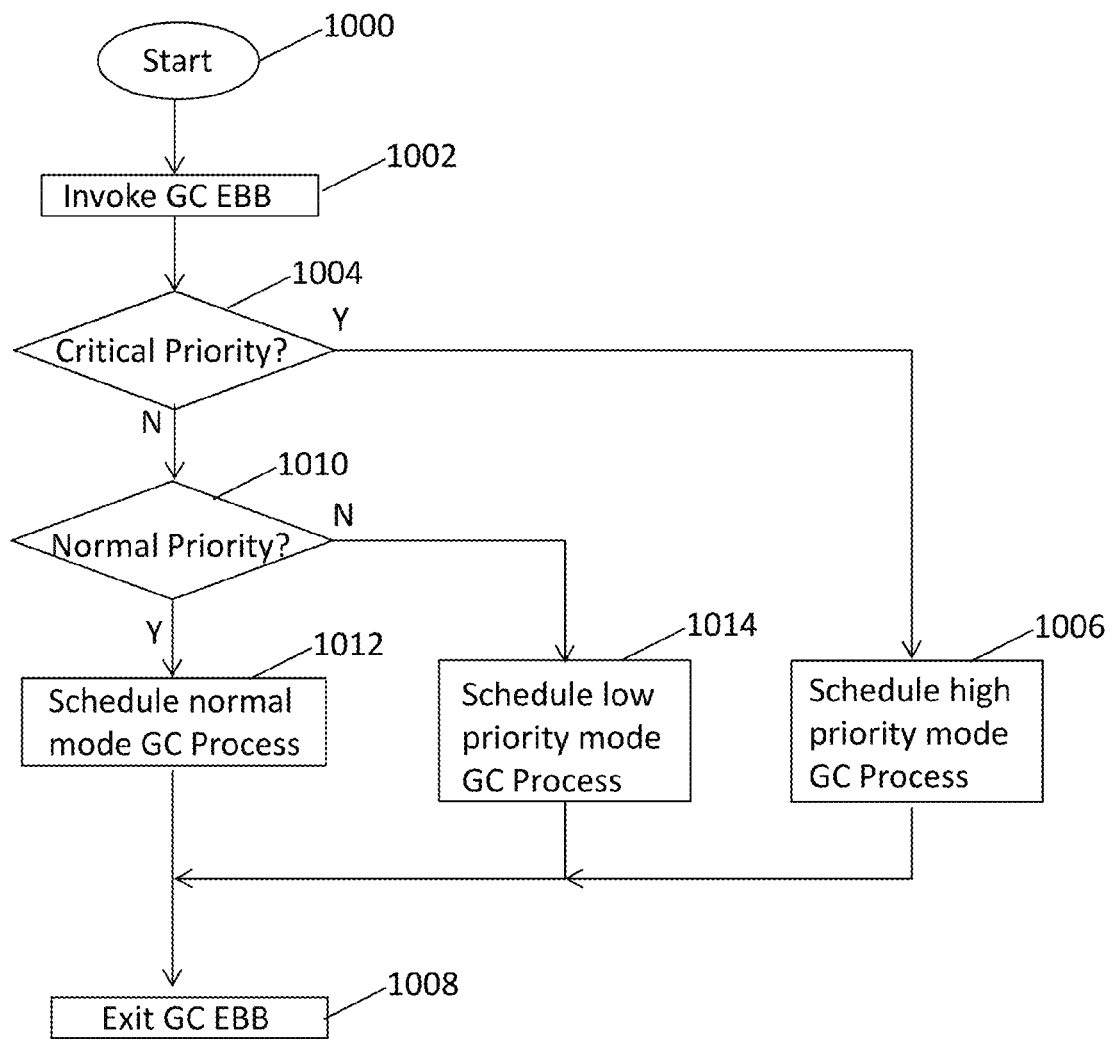
FIG. 10 is a flow diagram illustrating a method of operating a garbage collection event-based branch to perform real-time scheduling of a garbage collection process according to a non-limiting embodiment.

Turning now to FIG. 10, a flow diagram illustrates a method of responding to a garbage collection event-based branch (EBB) to perform real-time scheduling of a garbage collection process according to a non-limiting embodiment. The method begins at operation 1000, and at operation 1002 the an event-based branch (EBB) is invoked when an application loads a pointer into the load monitored region (as explained earlier) which allows the garbage collection handler to obtain processing control. At operation 1004, the handler determines a priority of the application. In at least one embodiment, each application is assigned a respective priority. Thus, the handler can obtain the priority directly from the application that is currently running or read the priority from a register in processor 102.

When the priority is assigned a first priority, e.g., a critical priority, the handler schedules the garbage collection process to perform garbage collection work according to a first mode, i.e., a high-priority mode at operation 1006. In at least one embodiment, the high-priority mode may include refraining from performing further garbage collection work beyond what is absolutely necessary in order to provide the correct pointer to the application. After completing the garbage collection process according to the first mode, the garbage collection EBB is exited at operation 1008. When, however, the priority is assigned a second priority, a third priority, etc., the handler schedules the garbage collection process to perform work according to a different mode. The different modes may include, for example, performing different amounts of garbage collection work (e.g., moving multiple objects from the load-monitored region in addition to providing the correct pointer to the application) than the amount performed according to the high-priority mode.

For instance, when the application is not a critical application (i.e., is not assigned a critical priority), a determination is made at operation 1010 as to whether the application is assigned a normal priority. When the application is assigned a normal priority, the handler schedules the garbage collection process to perform garbage collection work according to a second mode (e.g., a normal mode) at operation 1012. The normal mode may include performing a greater amount of garbage collection work than the amount performed according to the high-priority mode. That is, the high-priority mode may refrain from performing any additional garbage collection work beyond providing the correct pointer to the application, while the normal mode allows the garbage collection process to continue with garbage collection work such as transferring multiple objects from the load-monitored region in order to consolidate the objects together in a smaller region of memory, performing bookkeeping tasks, etc. When the garbage collection process according to the normal mode is completed, the garbage collection EBB is exited at operation 1008.

When, however, it is determined that the application is not assigned a normal priority at operation 1010, the handler determines that the application has a low-priority, for example, and schedules the garbage collection process to perform garbage collection work according to a third mode, e.g., a low-priority mode, at operation 1014. In at least one embodiment, the low-priority mode includes performing a greater amount of garbage collection work than both the high-priority mode and the normal priority mode. When the garbage collection process according to the low-priority mode is completed, the garbage collection EBB is exited at operation 1008.

Although three priorities and three garbage collection modes are illustrated, it should be appreciated that more or less priorities and/or garbage collection modes may be implemented without departing from the scope of the invention. In addition, the priority of the application may be based on various characteristics including, but not limited to, the type of tasks performed by the application, the amount time available to the application to respond to an input (i.e., application latency), etc. For example, a task to perform a transaction may be viewed as a time-critical task and therefore is assigned a critical priority. It should be appreciated that the current tasks and/or application actively changes. In this manner, selecting a work mode among a plurality of different work modes based on the priority of the actively running application allows a wide range of applications to be supported while ensuring sufficient garbage collection work is completed without violating the timing constraints of the applications.

Figure 11:
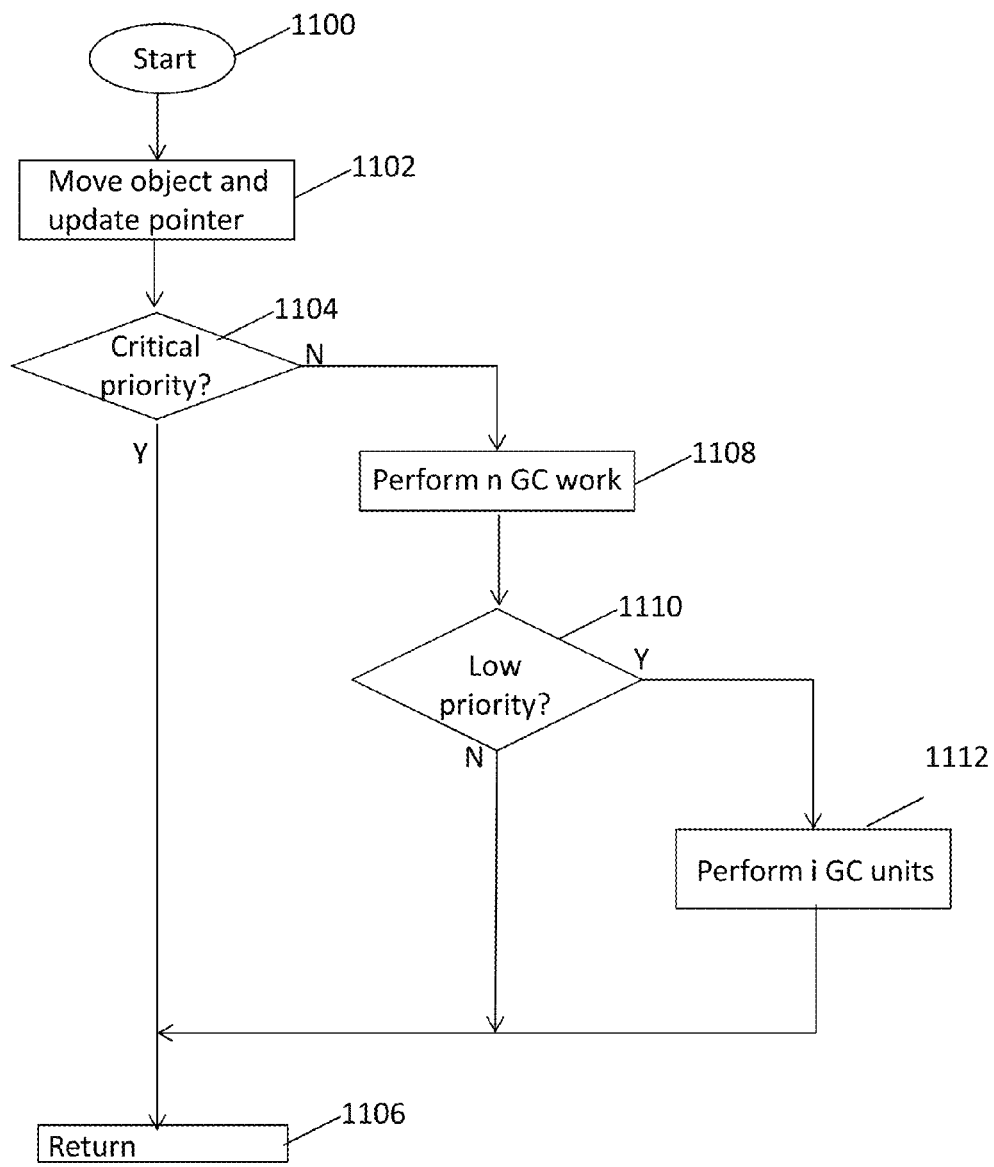
FIG. 11 is a flow diagram illustrating a garbage collection process according to the real-time scheduling illustrated in FIG. 10 according to a non-limiting embodiment.

Turning now to FIG. 11, a flow diagram illustrates operation of the garbage collection process that occurs in operations 1006, 1012, and 1014 of FIG. 10. The method begins at operation 1100, where the GC process is invoked (see FIG. 10, operations 1006, 1012, 1014). At operation 1102, the object that was in the process of being accessed when the EBB occurred may be moved to a memory location that is outside of the load-monitored region. In addition, the pointer that was being accessed is updated so as to point to the relocated object, and control is returned to the ldmx instruction, which is re-executed. Alternatively, operation 1102 may not move the object, but instead emulate access to the object by storing the unmodified pointer back into the destination register of the pointer load instruction. This alternative may be employed for critical applications or at other times when the object being accessed is very large and thus moving it would unacceptably delay the application. If this alternative is taken, when the GC EBB is exited (i.e., returned) in operation 1106, it has the effect of emulating access to the unmodified pointer, and control is transferred back to the application at the instruction following the ldmx.

Turing now to operation 1104, a process begins to determine whether the garbage collection process was entered for a high-priority (i.e. critical) application, a normal priority application, or a low-priority application. When the process is entered with a critical priority, no further garbage collection work is performed, and control proceeds to operation 1106, where the garbage collection handler is exited.

When however, the application is not assigned a critical priority, some additional garbage collection work (e.g., "n" number objects are moved or n units of garbage collection work) is performed at operation 1108. The additional garbage collection work may be any amount that does not delay the application longer than the time constraints of the application, if any, allow. The amount of garbage collection work performed during a normal mode may include, but is not limited to, moving a fixed number of additional objects (where the fixed number is an arbitrary selected number, a percentage of the number of objects remaining in the load-monitoring region, a percentage of the original number of objects initially located in the load-monitored region, etc.), moving a number of objects that is proportional to the hardware application priority, or moving as many objects as possible within a given time period.

After performing the garbage collection according to the normal priority mode in operation 1108, a determination is made as to whether the process was entered for a low-priority application at operation 1110. If the application is not assigned a low priority (i.e., is a normal application), control is returned to operation 1106, where the garbage collection handler is exited. When, however, the application is assigned a low priority, further garbage collection work (e.g., "i" number of additional objects are moved) is performed according to a low-priority mode at operation 1112. After completing additional garbage collection work according to the low-priority mode, control is returned to operation 1106, where the garbage collection handler is exited. Accordingly, the amount of work performed after completing garbage collection according to the normal priority mode is greater than the amount of work performed according to the high-priority mode, while the amount of work performed after completing the garbage collection process according to the low-priority mode is greater than the amount of work performed after completing both the high-priority mode and the normal priority mode.

In at least one embodiment, a taxation or credit-based scheme is employed. According to this credit-based scheme, each non-critical application is required to do a certain amount of garbage collection work when it accesses a pointer to the load monitored region and thus causes a garbage collection EBB. These applications are also assigned a credit which represents an amount of garbage collection work that the application is allowed to defer when it causes entry into the garbage collection EBB. As an example, the units of work may be a number of objects to be moved, the time spent moving objects, or some other quantum indicative of garbage collection work.

Each application may be assigned a different value of credit, depending on the tasks performed by the application. If the garbage collection process was not entered due to a critical application, then the amount of garbage collection work that is performed depends on the application's available credit. For example, each application may be initially assigned 10 time units of credit. If the application's credit is nonzero when it attempts to load a pointer to an object in the load monitored and an EBB occurs, then the credit of the application or thread is decremented and control is returned to the application without performing any additional garbage collection work beyond the moving of the object in operation 1102. If, however, the application's credit is zero when the EBB occurs (due to exhaustion of the credit by previous), then the thread is required to perform additional garbage collection work in order to replenish its credit by performing additional garbage collection work. The amount of credit required to be replenished is chosen according to the needs of the garbage control process and/or the time constraints of the application. For example, if the garbage collection process is progressing too slowly, an application may be required to replenish all of its original credit, whereas if the garbage collection process is progressing normally, only a minimal amount of additional work, if any, may be required. The amount of additional work performed may be simply to move one additional object, or it could be to perform additional garbage collection work depending on the policy of the garbage collection process. After performing this additional garbage collection work, the credit of the active critical application is incremented accordingly.

In at least one embodiment, one or more background application or thread(s) replenish the credits of application threads from time to time, thereby decreasing the probability that any thread will run out of credit and be forced to perform garbage collection work. Also, in some embodiments, applications with very low priority may be required to replenish the credits of higher-priority threads in order to decrease the loading on the higher-priority threads.

Figure 12:
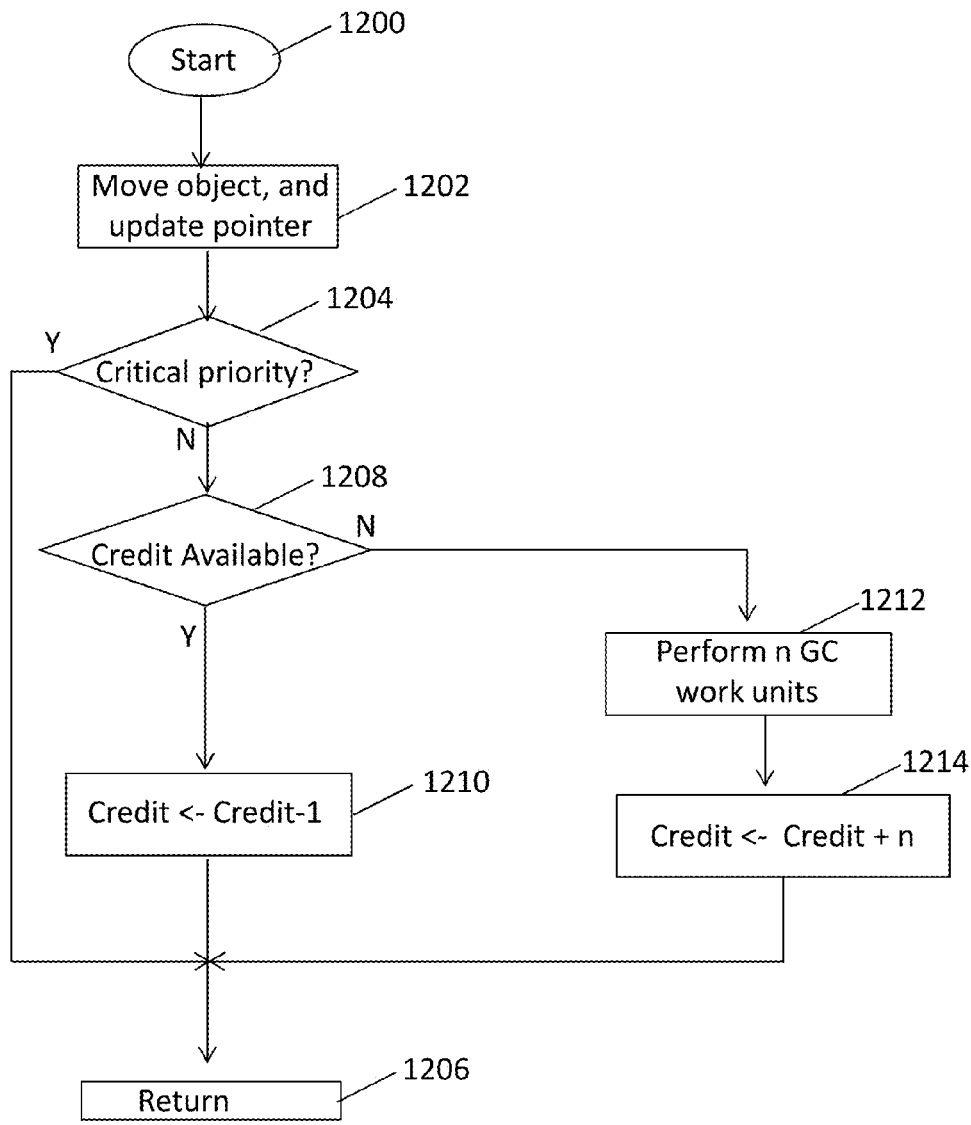
FIG. 12 is a flow diagram illustrating a credit-based scheme for performing real-time garbage collection scheduling according to a non-limiting embodiment.

Turning now to FIG. 12, a flow diagram illustrates an alternative operation of the garbage collection process that occurs in operations 1006, 1012, and 1014 of FIG. 10. The method begins at operation 1200, where the garbage collection process is invoked (see FIG. 10, operations 1006, 1012, 1014). At operation 1202, an object is moved from the load-monitored region to a region of the memory not undergoing garbage collection, and the pointer is updated with the address of the relocated object.

Turing now to operation 1204, a process begins to determine whether the garbage collection process was entered for a high-priority (i.e. critical) application, a normal priority application, or a low-priority application. When the process is entered with a critical priority at operation 1204, no further garbage collection work is performed, and control proceeds to operation 1206, where and the garbage collection handler is exited.

When the application is not a critical application, however, a determination is made as to whether or not the application has any remaining credit at operation 1208. In at least one embodiment, however, this determination is based on whether or not the application's credit is below a certain non-zero threshold value. For example, if the threshold hold is set to 5 units of work, then the application is determined to have available credits when the credit sum is greater than the threshold, i.e., 5 work units. When the amount of remaining credit is greater than the threshold, then the credit of the application is decremented by one unit at operation 1210, and the garbage collection is exited at operation 1206 without performing any further garbage collection work.

When, however, the application does not have sufficient credit available (e.g., the credit is less than or equal to the threshold value), the application is forced to perform additional garbage collection work at operation 1212. The amount the application performs is determined by the garbage collection handler based on the priority of the application and the current state of the garbage collection process. At operation 1214, the credit of the application is incremented by the number of units of garbage collection performed, and control is returned to operation 1206, where the garbage collection handler is exited.

As described above, various non-limiting embodiments provide a garbage collection system including real-time garbage collection scheduling. In at least one embodiment, the real-time garbage collection scheduling includes a garbage collection work allocation scheme that determines the amount of garbage collection each application performs based on the priority of the application. Alternatively, a credit-based work allocation scheme may be employed in which the amount of garbage collection work each application performs is based on the rate of object usage of the portion of the heap undergoing garbage collection. In addition, the neither of these work allocation schemes depend on periodic interrupts to perform garbage collection or cause all applications to simultaneously to pause execution during the compaction phase of garbage collection (i.e. when objects are in the process of being moved). In this manner, the amount of garbage collection work an application is required to perform is tailored to the priority needs of the application, while also ensuring that all applications perform their fair share of the garbage collection work. In at least one embodiment, the garbage collection process allows high-priority applications to continue execution without being required to perform any garbage collection work beyond that which is necessary to complete the object accesses that they make in order to allow them to meet latency and other performance requirements.

Figure 13:
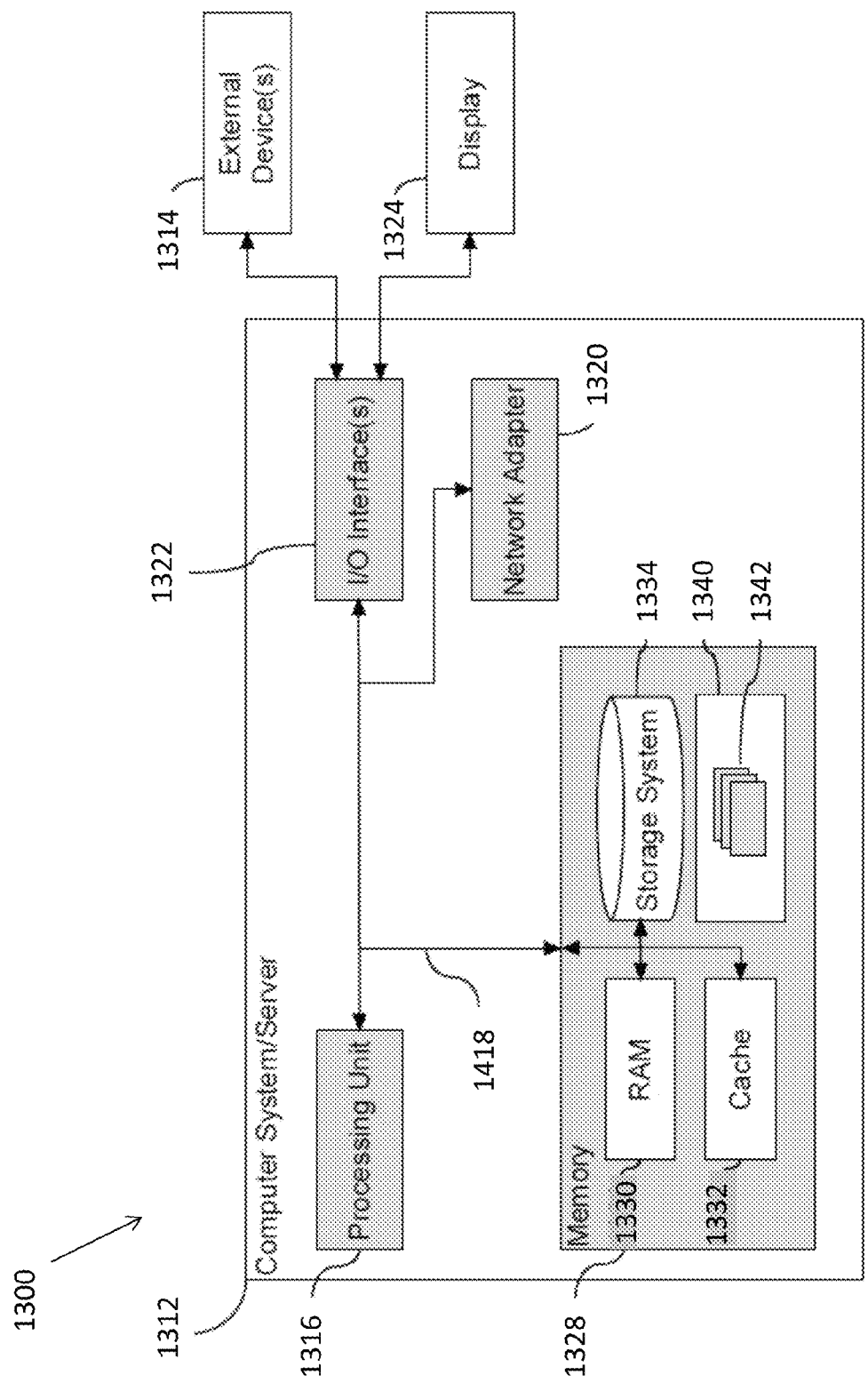
FIG. 13 depicts a block diagram illustrating a system to perform a garbage collection process according to a non-limiting embodiment.

Referring now to FIG. 13, a computer system/server (1312) is shown in the form of a general-purpose computing device. The components of computer system/server (1312) may include, but are not limited to, one or more processors or processing units (1316), a system memory (1328), and a bus (1318) that couples various system components, including system memory (1328) to processor (1316).

Bus (1318) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (1312) typically includes a variety of computer system readable media. Such media may be any available media that is accessible by computer system/server (1312), and it includes both volatile and non-volatile media, removable and non-removable media.

System memory (1328) can include computer system readable media in the form of volatile memory, such as random access memory (RAM) (1330) and/or cache memory (1332). Computer system/server (1312) may further include other removable/non-removable, volatile/non-volatile computer system storage media. By way of example only, storage system (1334) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1318) by one or more data media interfaces. As will be further depicted and described below, memory (1328) may include at least one program product having a set (e.g., at least one) of program modules that are configured to carry out the functions of embodiments of the invention.

Program/utility (1340), having a set (at least one) of program modules (1342), may be stored in memory (1328) by way of example, and not limitation, as well as an operating system, one or more application programs, other program modules, and program data. Each of the operating system, one or more application programs, other program modules, and program data or some combination thereof, may include an implementation of a networking environment. Program modules (1342) generally carry out the functions and/or methodologies of embodiments of the invention as described herein.

Computer system/server (1312) may also communicate with one or more external devices (1314) such as a keyboard, a pointing device, a display (1324), etc.; one or more devices that enable a user to interact with computer system/server (1312); and/or any devices (e.g., network card, modem, etc.) that enable computer system/server (1312) to communicate with one or more other computing devices. Such communication can occur via Input/Output (I/O) interfaces (1322). Still yet, computer system/server (1312) can communicate with one or more networks such as a local area network (LAN), a general wide area network (WAN), and/or a public network (e.g., the Internet) via network adapter (1320). As depicted, network adapter (1320) communicates with the other components of computer system/server (1312) via bus (1318). It should be understood that although not shown, other hardware and/or software components could be used in conjunction with computer system/server (1312). Examples, include, but are not limited to: microcode, device drivers, redundant processing units, external disk drive arrays, RAID systems, tape drives, and data archival storage systems, etc.

Figure 14:
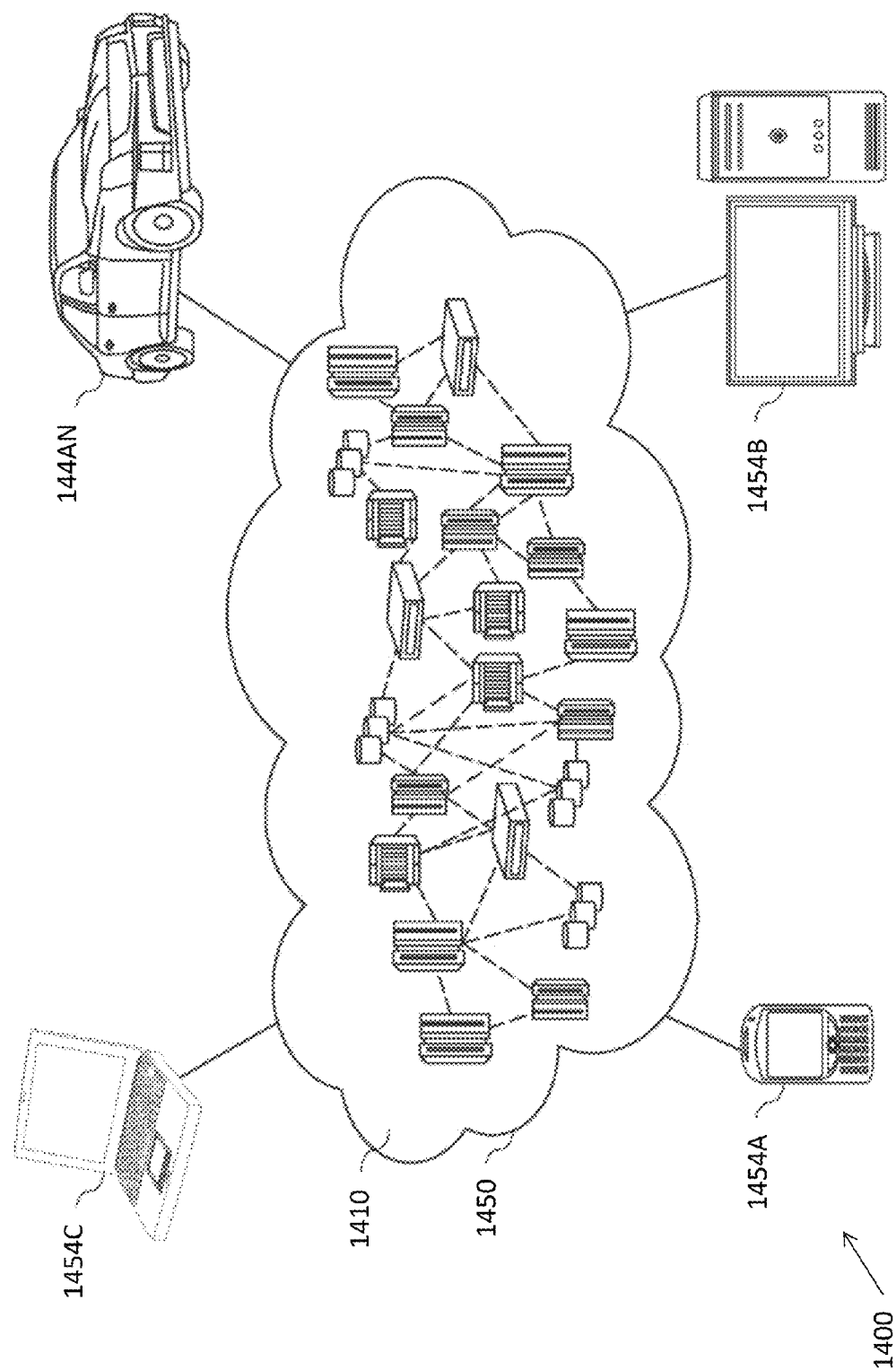
FIG. 14 depicts an illustrative example of a cloud computing environment according to a non-limiting embodiment.

Referring to FIG. 14, an illustrative cloud computing environment (1400) is depicted. As shown, cloud computing environment (1400) comprises one or more cloud computing nodes (1410) with which local computing devices used by cloud consumers, such as, for example, personal digital assistant (PDA) or cellular telephone (1454A), desktop computer (1454B), laptop computer (1454C), and/or automobile computer system (1454N) may communicate. Nodes (1410) may communicate with one another. They may be grouped (not shown) physically or virtually, in one or more networks, such as Private, Community, Public, or Hybrid clouds as described hereinabove, or a combination thereof. This allows cloud computing environment (1400) to offer infrastructure, platforms and/or software as services for which a cloud consumer does not need to maintain resources on a local computing device. It is understood that the types of computing devices (1454A)-(1454N) shown in FIG. 14 are intended to be illustrative only and that computing nodes (1410) and cloud computing environment (1400) can communicate with any type of computerized device over any type of network and/or network addressable connection (e.g., using a web browser).

Figure 15:
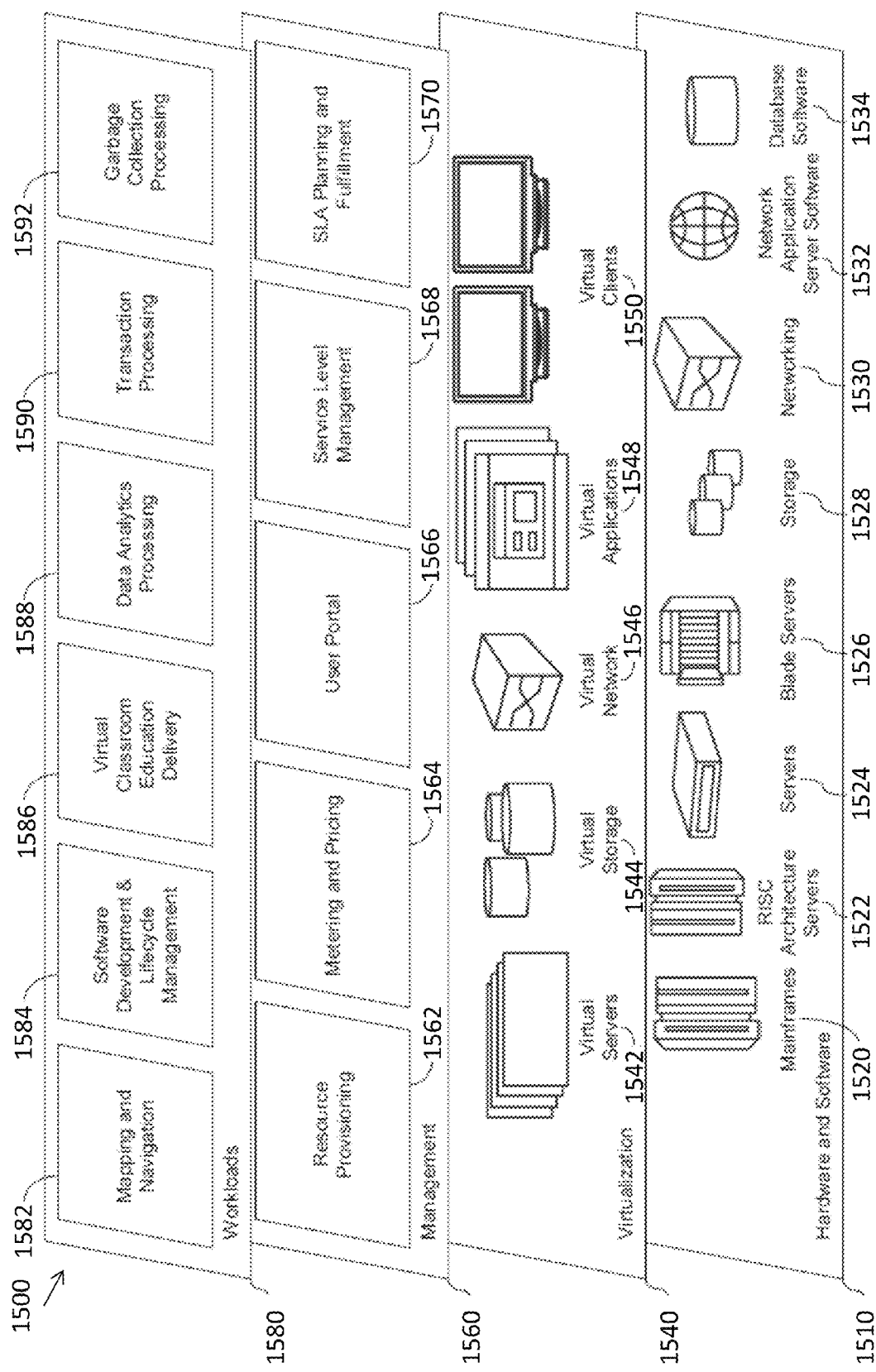
FIG. 15 depicts an illustrative example of abstraction model layers according to a non-limiting embodiment.

Referring now to FIG. 15, a set of functional abstraction layers (1500) provided by cloud computing environment (1400) of FIG. 14 is shown. It should be understood in advance that the components, layers, and functions shown in FIG. 15 are intended to be illustrative only and embodiments of the invention are not limited thereto. As depicted, the following layers and corresponding functions are provided:

Hardware and software layer (1510) includes hardware and software components. Examples of hardware components include mainframes (1520); RISC (Reduced Instruction Set Computer) architecture based servers (1522); servers (1524); blade servers (1526); storage devices (1528); networks and networking components (1530). In some embodiments, software components include network application server software (1732) and database software (1534).

Virtualization layer (1540) provides an abstraction layer from which the following examples of virtual entities may be provided: virtual servers (1542); virtual storage (1544); virtual networks (1546), including virtual private networks; virtual applications and operating systems (1548); and virtual clients (1550).

In one example, management layer (1560) may provide the functions described below. Resource provisioning (1562) provides dynamic procurement of computing resources and other resources that are utilized to perform tasks within the cloud computing environment.

Metering and Pricing (1564) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources.

User portal (1566) provides access to the cloud computing environment for consumers and system administrators. Service level management (1568) provides cloud computing resource allocation and management such that required service levels are met. Service Level Agreement (SLA) planning and fulfillment (1570) provide pre-arrangement for, and procurement of, cloud computing resources for which a future requirement is anticipated in accordance with an SLA.

Workloads layer (1580) provides examples of functionality for which the cloud computing environment may be utilized. Examples of workloads and functions which may be provided from this layer include: mapping and navigation (1582); software development and lifecycle management (1584); virtual classroom education delivery (1786); data analytics processing (1588); transaction processing (1590); and garbage collection processing of one or more aspects of the present invention (1592).

Various embodiments of the invention may be employed as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system to schedule a garbage collection process within a computing environment, the computer system comprising:
    a memory unit including a load-monitored region configured to undergo a garbage collection process; and
    a hardware computer processor in communication with the memory unit, wherein the hardware computer processor is configured to perform operations comprising:
        invoking a handler to obtain processing control in response to a request from an application to load a pointer that points to an object located within the load-monitored region; and
        determining by the handler a priority of the application, and
    performing a garbage selection process according to one mode among a plurality of different modes based on the priority.

2. The computer system of claim 1, wherein the priority is based on at least one task performed by the application.

3. The computer system of claim 1, wherein a first amount of garbage collection work performed according to a first mode is less than a second amount of garbage collection work performed according to a second mode.

4. The computer system of claim 1, wherein the garbage collection work includes moving at least one object from the load-monitored region to a second region of the memory unit located outside the load-monitored region.

5. The computer system of claim 1, wherein the handler determines a credit sum assigned to the application, and determines the mode based on the credit sum.

6. The computer system of claim 5, wherein the handler over-rides the priority of the application when the credit sum is less than a credit threshold.

7. The computer system of claim 5, wherein the handler decrements the credit sum when the garbage collection process is performed according to the first mode and increments the credit sum after performing according to the second mode.

8. A method of performing real-time garbage collection scheduling to manage a memory unit, the method comprising:
    designating in the memory unit a load-monitored region configured to undergo a garbage collection process;
    invoking a handler to obtain processing control in response to a request from an application to load a pointer that points to an object located within the load-monitored region;
    determining by the handler a priority of the application; and
    performing a garbage selection process according to one mode among a plurality of different modes based on the priority.

9. The method of claim 8, wherein the priority is based on at least one task performed by the application.

10. The method of claim 8, wherein a first amount of garbage collection work performed according to a first mode is less than a second amount of garbage collection work performed according to a second mode.

11. The method of claim 8, wherein the garbage collection work includes moving at least one object from the load-monitored region to a second region of the memory unit located outside the load-monitored region.

12. The method of claim 8, wherein the handler determines a credit sum assigned to the application, and determines the mode based on the credit sum.

13. The method of claim 12, wherein the handler overrides the priority of the application when the credit sum is less than a credit threshold.

14. The method of claim 12, wherein the handler decrements the credit sum when the garbage collection process is performed according to the first mode and increments the credit sum after performing according to the second mode.

15. A computer program product of performing real-time garbage collection scheduling to manage a memory unit, the computer program product comprising a computer readable storage medium having program instructions embodied therewith, the program instructions executable by an electronic computer processor to perform operations comprising:
- designating in the memory unit a load-monitored region configured to undergo a garbage collection process;
- invoking a handler to obtain processing control in response to a request from an application to load a pointer that points to an object located within the load-monitored region;
- determining by the handler a priority of the application; and
- performing a garbage selection process according to one mode among a plurality of different modes based on the priority.

16. The computer program product of claim 15, wherein the priority is based on at least one task performed by the application.

17. The computer program product of claim 15, wherein a first amount of garbage collection work performed according to a first mode is less than a second amount of garbage collection work performed according to a second mode.

18. The computer program product of claim 15, wherein the garbage collection work includes moving at least one object from the load-monitored region to a second region of the memory unit located outside the load-monitored region.

19. The computer program product of claim 15, wherein the handler determines a credit sum assigned to the application, determines the mode based on the credit sum, and over-rides the priority of the application when the credit sum is less than a credit threshold.

20. The computer program product of claim 19, wherein the handler decrements the credit sum when the garbage collection process is performed according to the first mode and increments the credit sum after performing according to the second mode.

* * * * *